(12) United States Patent
Flores et al.

(10) Patent No.: US 7,469,170 B2
(45) Date of Patent: Dec. 23, 2008

(54) DEVICE AND METHOD FOR ASSESSING THE SAFETY OF SYSTEMS AND FOR OBTAINING SAFETY IN SYSTEM, AND CORRESPONDING COMPUTER PROGRAM

(75) Inventors: Pio Torre Flores, Stuttgart (DE); Andreas Lapp, Tamm (DE); Wolfgang Laengst, München (DE)

(73) Assignee: Robert Bosch GmbH, Stuttgart (DE)

( * ) Notice: Subject to any disclaimer, the term of this patent is extended or adjusted under 35 U.S.C. 154(b) by 12 days.

(21) Appl. No.: 10/506,372

(22) PCT Filed: Feb. 6, 2003

(86) PCT No.: PCT/DE03/00329

§ 371 (c)(1),
(2), (4) Date: May 23, 2005

(87) PCT Pub. No.: WO03/075104

PCT Pub. Date: Sep. 12, 2003

(65) Prior Publication Data

US 2005/0223263 A1     Oct. 6, 2005

(30) Foreign Application Priority Data

Mar. 1, 2002    (DE) ................ 102 08 866

(51) Int. Cl.
*G01M 17/00* (2006.01)
(52) U.S. Cl. .............................. 701/29; 702/84
(58) Field of Classification Search ............. 701/29; 702/84; 700/29; 703/24
See application file for complete search history.

(56) References Cited

U.S. PATENT DOCUMENTS 6,577,971 B2 *   6/2003   Aitken et al. .................. 702/81
6,684,349 B2 *   1/2004   Gullo et al. .................... 714/47
6,816,798 B2 *  11/2004   Pena-Nieves et al. ......... 702/84

FOREIGN PATENT DOCUMENTS

| DE | 196 39 424 | 3/1997 |
|---|---|---|
| DE | 100 15 114 | 10/2001 |
| JP | 62291537 | 12/1987 |

(Continued)

OTHER PUBLICATIONS

Bertram et al., "The Safety-Related Aspect of Cartronic", SAE Technical Paper Series, Inernational Congressw and Exposition, Do. No. 1999-01-0488, Mar. 4, 1999.

(Continued)

*Primary Examiner*—Mark Hellner
(74) *Attorney, Agent, or Firm*—Kenyon & Kenyon LLP

(57) ABSTRACT

Method, device and computer program for implementing a safety analysis in systems, in particular in a motor vehicle, the systems or the at least one system having multiple components linked by communication relationships, the components and their communication relationships forming a functional structure of the systems or the at least one system, errors being determined as a function of the functional structure, and these error dependencies being analyzed with respect to the functional structure.

15 Claims, 12 Drawing Sheets

FOREIGN PATENT DOCUMENTS

| | | |
|---|---|---|
| JP | 01265311 | 10/1989 |
| JP | 04175694 | 6/1992 |
| JP | 04252776 | 9/1992 |
| JP | 06123642 | 5/1994 |
| JP | 09146630 | 6/1997 |
| JP | 10-024783 * | 1/1998 |
| JP | 2001100835 | 4/2001 |
| JP | 2001-339412 * | 12/2001 |

OTHER PUBLICATIONS

T. Bertram, et al., 1998, Cartronic, An Open Architecture for Networking the Control Systems of an Automobile, Detroit, Michigan, USA, SAE 98200.

P. Flores, et al., 2001, Integration of a Structuring Concept for Vehicle Control Systems into the Software Development Process Using UML Modeling Methods, Detroit, Michigan, USA, SAE 2001-01-0066.

* cited by examiner

Fig. 1
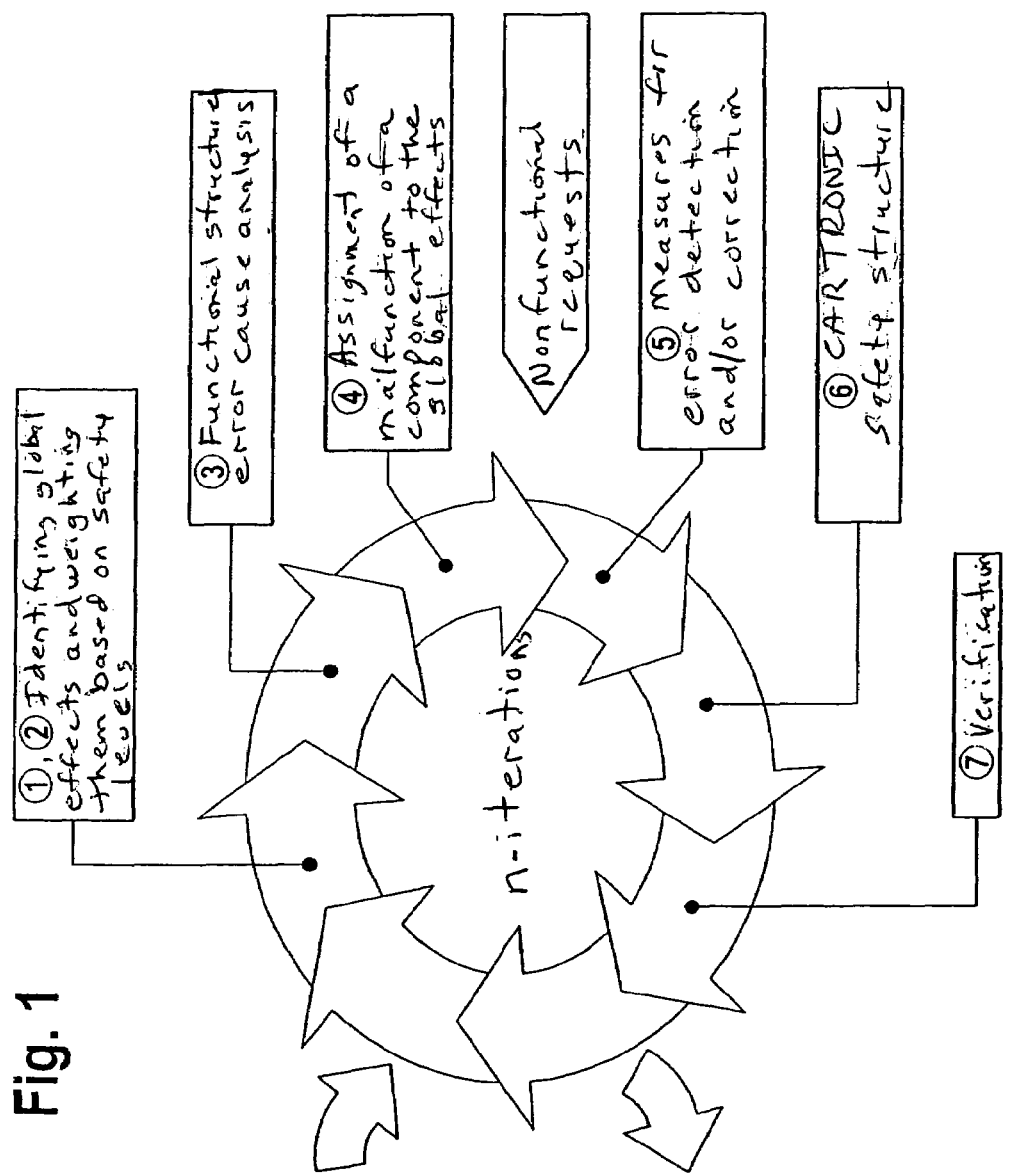
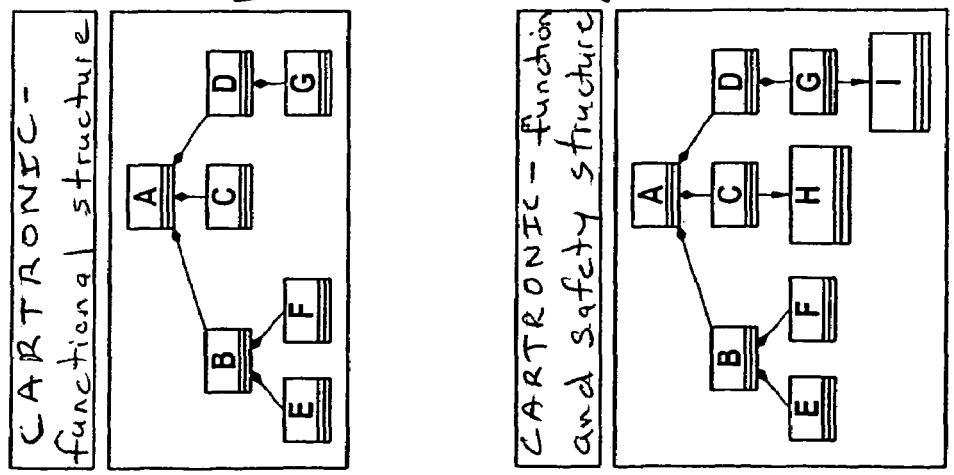

Fig. 4

| Global effects | Acceleration effect | | Braking effect | | Signaling | |
|---|---|---|---|---|---|---|
| | Uncontrolled acceleration | No acceleration | No braking effect | Too little braking effect | No display | Continuous display |
| | acceleration too great | acceleration too weak | | | | |

Global effects →

Fig. 6

| Global effects | Acceleration effect | | | Braking effect | | Signaling | |
|---|---|---|---|---|---|---|---|
| | uncontrolled Acceleration | | No Acceleration | No braking effect | Too little braking effect | No display | Continuous display |
| | Acceleration too great | Acceleration too weak | | | | | |
| SL | 3 | 1 | 1 | 4 | 3 | 1 | 1 |

| Global effects | Acceleration effect | | Braking effect | | Signaling | | Malfunction \ Functional structure | fc₁ | | fc₂ | | fc₂₁ | | fc₂₂ | | fc₃ | | fc₄ | |
|---|---|---|---|---|---|---|---|---|---|---|---|---|---|---|---|---|---|---|---|
| | uncontrolled acceleration | no acceleration | no braking effect | too little braking effect | no display | continuing display | | C | M | C | M | C | M | C | M | C | M | C | M |
| SL | 2 | 1 | 4 | 3 | 1 | 1 | fc₁ | x | R_R1 R_R2 I_I1 | | | | | | | | | | |
| | | | | | | | fc₂ | | | x O_O1 | | | | | | | | | |
| | | | | | | | fc₂₁ | | | | | x O_O1 | | | | | | | |
| | | | | | | | fc₂₂ | | | | | | | x O_O3 | | | | | |
| | | | | | | | fc₃ | | | | | | | | | x O_O2 | | | |
| | | | | | | | fc₄ | | | | | | | | | | | x | R_R3 |

Fig. 7

The following abbreviations are used for the components:

fc₁ → torque distributor
fc₂ → brake system
fc₂₁ → brake system coordinator
fc₂₂ → brake actuator
fc₃ → propulsion
fc₄ → brake light Columns C and M in the functional structure stand for:

C: Component
M: Message

| Side effects | Acceleration effect | | Braking effect | | Signaling | |
|---|---|---|---|---|---|---|
| SL | uncontrolled acceleration | No acceleration | No braking effect | too little braking effect | No display | Continuous display |
| | 1 | 2 | 4 | 3 | 1 | 1 |

| Main function | Functional structure | fc₁ | | fc₂ | | fc₂₁ | | fc₂₂ | | fc₃ | | fc₄ | |
|---|---|---|---|---|---|---|---|---|---|---|---|---|---|
| | | C | M | C | M | C | M | C | M | C | M | C | M |
| fc₁ | | x | R_R1 R_R2 I_I1 | | | | | | | | | | |
| fc₂ | | x | R_R1 R_R2 I_I1 | x | O_01 | | | | | | | | |
| | fc₂₁ | x | R_R1 R_R2 I_I1 | | | x | O_01 | | | x | O_02 | | |
| | fc₂₂ | x | R_R1 R_R2 I_I1 | | | | | x | O_03 R_R1 | x | O_02 | | |
| fc₃ | | x | R_R1 R_R2 I_I1 | | | x | O_01 | | | x | O_02 | | |
| fc₄ | | x | R_R1 R_R2 I_I1 | | | x | O_01 | | | x | O_02 | x | R_R3 |

Fig. 8a

Columns C and M in the functional
Structure stand for:
C: Component
M: message

The following abbreviations are used
for the components:

fc₁ → torque distributor   fc₂₂ → brake actuator
fc₂ → brake system         fc₃ → propulsion
fc₂₁ → brake system coordinator   fc₄ → brake light

| Global effects | Acceleration effect | | Braking effect | | Signaling | | Functional structure | $fc_1$ | | $fc_2$ | | $fc_{21}$ | | $fc_{22}$ | | $fc_3$ | | $fc_4$ | |
|---|---|---|---|---|---|---|---|---|---|---|---|---|---|---|---|---|---|---|---|
| | uncontrolled acceleration | No acceleration | No braking effect | Too little braking effect | No display | continuous display | | C | M | C | M | C | M | C | M | C | M | C | M |
| SL | 2 | 1 | 4 | 3 | 1 | 1 | | | | | | | | | | | | | |
| | | | | | | | $fc_1$ | x | R_R1 R_R2 I_I1 | | | | | | | | | | |
| | | | | | | | $fc_2$ | x | R_R1 R_R2 I_I1 | x | O_01 | | | | | | | | |
| | | | | | | | $fc_{21}$ | x | R_R1 R_R2 I_I1 | | | x | O_01 | | | x | O_02 | | |
| | | | | | | | $fc_{22}$ | x | R_R1 R_R2 I_I1 | | | x | O_01 | x | O_03 R_R1 | x | O_02 | | |
| | | | X | | | | $fc_3$ | x | R_R1 R_R2 I_I1 | | | x | O_01 | | | x | O_02 | | |
| | | | | | | X | $fc_4$ | x | R_R1 R_R2 I_I1 | | | x | O_01 | | | x | O_02 | x | R_R3 |

Fig. 8b

Columns C and M in the functional structure stand for:
C: component
M: message

The following abbreviations are used for the components:
$fc_1$ → torque distributor
$fc_2$ → brake system
$fc_{21}$ → brake system coordinator
$fc_{22}$ → brake actuator
$fc_3$ → propulsion
$fc_4$ → brake light

| Global effects | Acceleration effect | | Braking effect | | Signaling | | Malfunction | Functional structure | fc₁ | | | fc₂ | | | fc₂₁ | | fc₂₂ | | fc₃ | | fc₄ | |
|---|---|---|---|---|---|---|---|---|---|---|---|---|---|---|---|---|---|---|---|---|---|---|
| | uncontrolled acceleration | No acceleration | No braking effect | too little braking effect | no display | continuous display | | | C | M | C | M | C | M | C | M | C | M | C | M |
| SL | 2 | 1 | 4 | 3 | 1 | 1 | | | | | | | | | | | | | | |
| | x | x | x | x | x | x | fc₁ | | x | R_R1 R_R2 I_I1 | | | | | | | | | | |
| | x | x | x | x | x | x | fc₂ | | x | R_R1 R_R2 I_I1 | x | O_O1 | | | | | | | | |
| | x | x | x | x | x | x | | fc₂₁ | x | R_R1 R_R2 I_I1 | | | x | O_O1 | | | x | O_O2 | | |
| | | | | | | | | fc₂₂ | x | R_R1 R_R2 I_I1 | | | x | O_O1 | x | O_O3 R_R1 | x | O_O2 | | |
| | x | x | x | x | | x | fc₃ | | | | | | x | O_O1 | | | x | O_O2 | | |
| | | | | | x | x | fc₄ | | | | | | x | O_O1 | | | x | O_O2 | x | R_R3 |

Fig. 8c

Columns C and M in the functional structure stand for:
C: component
M: message

The following abbreviations are used for the components:

fc₁ → torque distributor
fc₂ → brake system
fc₂₁ → brake system coordinator
fc₂₂ → brake actuator
fc₃ → propulsion
fc₄ → brake light

Fig. 8d

| Effects of Malfunction | Acceleration effect | | Braking effect | | Signaling | | SL | Malfunction | Function and Structure | fc1 | | fc2 | | fc21 | | fc22 | | fc3 | | fc4 | |
|---|---|---|---|---|---|---|---|---|---|---|---|---|---|---|---|---|---|---|---|---|---|
| | uncontrolled acceleration | no acceleration | no braking effect | too little braking effect | no display | continuous display | | | | C | M | C | M | C | M | | M | C | M | C | M |
| SL | 2 | 1 | 4 | 3 | 1 | 1 | | | | | | | | | | | | | | | |
| | x | x | x | x | x | x | 4 | fc1 | | x | R_R1 R_R2 I_I1 | | | | | | | | | | |
| | x | x | x | x | x | x | 4 | fc2 | | x | R_R1 R_R2 I_I1 | | x O_01 | | | | | | | | |
| | x | x | [x] | [x] | x | x | 4 | | fc21 | x | R_R1 R_R2 I_I1 | | | x O_01 | | | x O_03 | x O_02 | | |
| | x | x | x | x | x | x | 4 | | fc22 | x | R_R1 R_R2 I_I1 | | | x O_01 | | | | x O_02 | | |
| | x | x | x | x | | x | 4 | fc3 | | x | R_R1 R_R2 I_I1 | | | x O_01 | | | | x O_02 | | |
| | [x] | [x] | | | [x] | [x] | 1 | fc4 | | x | R_R1 R_R2 I_I1 | | | x O_01 | | | | x O_02 | x R_R3 | |

Columns C and M in the function structure stand for:
- C: component
- M: message The following abbreviations are used for the components:
- fc1 → torque distributor
- fc2 → brake system
- fc21 → brake system coordinator
- fc22 → brake actuator
- fc3 → propulsion
- fc4 → brake light

DEVICE AND METHOD FOR ASSESSING THE SAFETY OF SYSTEMS AND FOR OBTAINING SAFETY IN SYSTEM, AND CORRESPONDING COMPUTER PROGRAM

FIELD OF THE INVENTION

The present invention relates to a device and a method for evaluating the safety of systems, in particular in motor vehicles, in an early phase of product development, as well as a corresponding computer program and a computer program product. A method called a CARTRONIC®-based safety analysis (CSA), is performed accordingly by the device and/or at the time of execution of the computer program.

BACKGROUND INFORMATION

It is a challenge not only to the automobile industry to meet the increasing demands for safety and reliability while at the same time shortening product development cycles. These boundary conditions make it necessary to take into account safety considerations at a very early point in time during product development. A short period of time from the start of planning until market introduction represents a decisive competitive advantage in establishing a product on the market before the competition. Taking a safety analysis into account in an early phase of product development should reduce and in the ideal case prevent tedious iterations for testing and improving the product in an advanced stage of product development. In an early development phase, a system is handled in an abstract manner, i.e., it is known which functions the system should fulfill and how these functions interact, but it is not known how these functions will be implemented (e.g., hardware, software, mechanics). This abstract approach may be represented by the CARTRONIC® structuring concept which is non-specific to the automobile manufacturer or supplier. This structuring concept forms the basis for the CARTRONIC®-based safety analysis.

The increasing complexity of the motor vehicle system in particular lies in the increasing complexity and number of individual subsystems but is also influenced to a significant extent by their increasing interconnection. The complexity of the motor vehicle system is mastered through the structuring of the subsystems according to CARTRONIC®, taking into account the interactions with other subsystems.

The CARTRONIC® structuring concept (see T. Bertram, R. Bitzer, R. Mayer, A. Volkhart, 1998, CARTRONIC—An Open Architecture for Networking the Control Systems of an Automobile, Detroit, Mich., USA, SAE 98200) is based on an object-oriented approach. The motor vehicle system is structured in logic function units which communicate with one another over standardized interfaces.

CARTRONIC® is a structuring concept for all the control and regulating systems of a vehicle. This concept contains modular and expandable architectures for "function" and "safety" based on agreed upon formal structuring and modeling rules.

The term "architecture" as used here is understood to refer to the structuring system (rules) as well as its implementation in a concrete structure. The function architecture includes all control and regulating functions that occur in the vehicle. The tasks of the system are assigned to functional components which define the interfaces of the components (functional interfaces) and their interaction. The safety architecture expands the function architecture by including elements which ensure reliable operation of the system.

Another form of representation is obtained by mapping into UML (Unified Modeling Language) which also facilitates porting onto a computer system. Mapping of a CARTRONIC® functional structure into a UML model is described in P. Torre Flores, A. Lapp, W. Hermsen, J. Schirmer, M. Walther, T. Bertram, J. Petersen, 2001, Integration of a Structuring Concept for Vehicle Control Systems into the Software Development Process Using UML Modeling Methods, Detroit, Mich., USA, SAE 2001-01-0066.

The basic unit for structuring is the functional component. A functional component represents a function in the motor vehicle system. For the sake of a compact presentation, instead of the term "functional component" the following discussion will use only the term "component." The components may be refined (increased detail) in the course of development with the higher-level function remaining as a shell. The higher-level function is in turn composed of components within the refinement (detailing) representing individual parts of the higher-level function. Three different types of components are differentiated in the structuring concept:

- components having mainly coordinating and distributing functions,
- components having mainly operative and executing functions and
- components that only generate and provide information.

In the communication relationships, a distinction is made between an order (with acknowledgment), an inquiry (with a reference) and a request. The order is characterized by the obligation to execute; in the event it is not fulfilled, the contractor receiving the order must send an acknowledgment to the requestor describing the reason for failure to execute. The inquiry is to acquire information for execution of an order. For the case when a component is unable to supply the requested information, it sends an instruction to the inquiring component. A request describes a "wish" for a function to be executed by another component. However, the request is not linked to the obligation for fulfillment, which is taken into account in the case of competing requests, for example. Table 1 summarizes the structural elements.

TABLE 1

| Structural element | Brief description |
| --- | --- |
| Functional component (abbreviated: component) | Function unit with clearly defined task |
| System | A system has multiple functional components, i.e., (sub) systems ("view from the inside to the outside"). The detailed functional component forwards the communication relationships to the subcomponents as expressed by an "is part of" relationship ("view from the outside to the inside"). |
| Order (with acknowledgment) | Instruction for action to a functional component with the obligation to execute |
| Inquiry (with instruction) | Information inquiry to a functional component |
| Request | Request to a functional component without the obligation to execute |
| Rule | Rules for:<br>☐ relationships<br>☐ modeling patterns |

The structuring rules describe allowed communication relationships within the architecture of the vehicle as a whole. A distinction is made between structuring rules which define the communication relationships on the same abstraction level and at higher and lower levels, taking into account the given boundary conditions. Furthermore, the structuring rules clarify the forwarding of communication relationships into detailing of another functionality.

A structure developed according to the rules of structuring and modeling is characterized by the following features:
- agreed-upon uniform rules of structuring and modeling at all abstraction levels,
- hierarchical order flows,
- high responsibility of the individual components,
- operating elements, sensors and estimators are equivalent information sources and
- encapsulation which represents each component as visibly as necessary for the other components and as invisibly as possible.

SUMMARY

An object of the present invention is to generate a method and a device as well as a corresponding computer program and computer program product which will permit an improved safety analysis and creation of an improved safety structure of at least one system in particular in a motor vehicle.

The present invention relates to a device, in particular a computer system and a computer program or a computer program product, as well as to a method for performing a safety analysis in systems, in particular in a motor vehicle, the systems or the at least one system being composed of multiple components between which there are communication relationships, the components and their communication relationships forming a functional structure of the systems or the at least one system, errors being advantageously determined as a function of the functional structure, and these error dependencies being analyzed with respect to the functional structure.

In one embodiment, the present invention has a device, in particular a computer system, and a computer program or a computer program product as well as a method for achieving a predefinable safety level in systems, in particular in a motor vehicle, the systems or at least one system including multiple components between which there are communication relationships, the components and their communication relationships forming a functional structure of systems, errors being determined as a function of the functional structure, and these error dependencies being analyzed with respect to the functional structure including the following steps:

a) Tracking the error dependencies in the functional structure and generating error paths as well as determining global effects of the errors,
b) Weighting the global effects as a function of preselectable safety levels,
c) Determining errors which cause a malfunction of a component or a communication relationship,
d) Assigning the malfunction of a component or a communication relation to the global effects,
e) Determining measures for error detection and/or error correction,
f) Determining the individual safety level and comparing the safety level thus determined with the safety level to be achieved, and
g) Restarting of the method at a) as a function of this comparison until achieving the safety level to be achieved.

Advantageously, a safety analysis is thus performed in an early phase of product development to promptly recognize problem areas and for early integration of safety measures into the functional structure ("safety through design").

The safety analysis according to the present invention is thus expediently depicted as an iterative analysis and improvement process.

The method for evaluating the safety of systems may advantageously be depicted on the basis of CARTRONIC® functional structures and/or CARTRONIC® UML models but it may also be applied to other system modeling methods.

This method is expediently performed by using the CSA table. Global error effects are identified and weighted by use of the CSA table. It documents error dependencies of components and communication relationships. A malfunction is caused by functional structure errors (FS errors) in components or communications. Communication errors (orders, requests) are taken into account in the target component of the communication. FS errors in inquiries are taken into account in the source component of the communication.

A malfunction of components is assigned to the global effects. In this way it is possible to achieve not only an evaluation of global states but also an evaluation of which components of the functional structure are responsible for it.

In a special embodiment, this method is integrated into a CARTRONIC®-based development process. This facilitates a formal systematic procedure.

Safety measures in particular are mapped into a CARTRONIC® UML model. This permits formal verification with respect to defined product requests or product specifications. Validation of the product specification is also possible with this procedure.

More extensive quantitative safety considerations may thus be implemented advantageously on the basis of the CSA table, the CARTRONIC® functional structure or the CARTRONIC® UML model including safety measures.

BRIEF DESCRIPTION OF THE DRAWINGS

The present invention is explained in greater detail below on the basis of the figures and the tables.

FIG. 1 shows a method, i.e., a procedure in the safety analysis.

FIG. 4 shows the table header of the CSA table containing the global effects.

FIG. 6 shows an example of weighting of the global effects.

FIG. 7 shows the error propagation in the functional structure, i.e., the assignment of FS errors to the global effects.

FIG. 8 is composed of individual FIGS. 8a, 8b, 8c and 8d, showing the CSA table, i.e., the safety table according to the example shown in FIG. 2, containing the corresponding designations.

DETAILED DESCRIPTION OF EXAMPLE EMBODIMENTS

Figure 2:
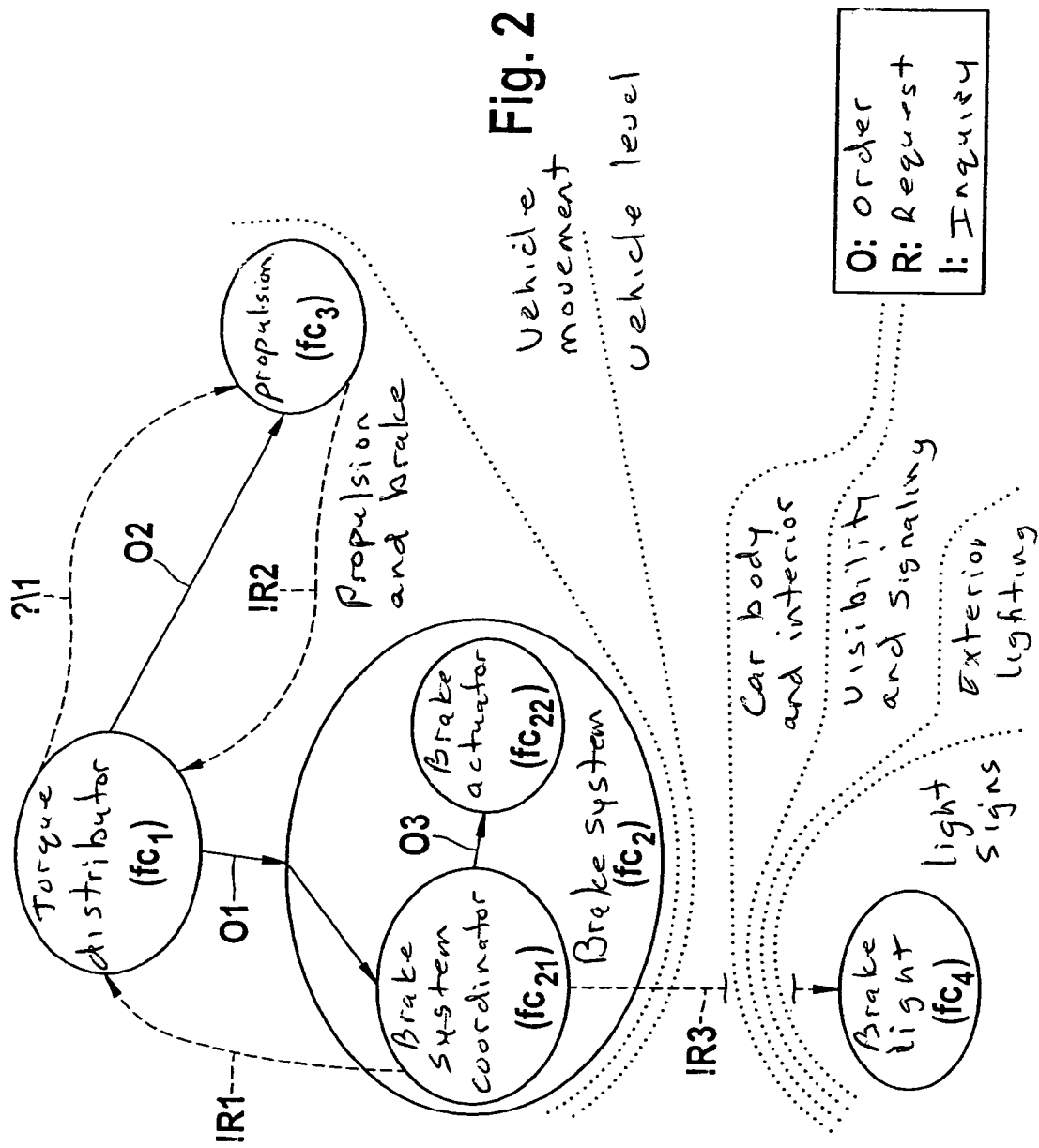
FIG. 2 shows the CARTRONIC® functional structure of a brake system which is considered as an example.

The safety analysis described below is based on the CARTRONIC® functional structure, i.e., the CARTRONIC® UML model of the system in question. The CARTRONIC® UML model is the mapping of a CARTRONIC® functional structure into UML (Unified Modeling Language). Due to the mapping into UML, a formalized and precisely specified depiction is obtained which facilitates an automated implementation of the present invention. The mapping of a CARTRONIC® functional structure into a UML model is described in P. Torre Flores, A. Lapp, W. Hermsen, J. Schirmer, M. Walther, T. Bertram, J. Petersen, 2001, Integration of a Structuring Concept for Vehicle Control Systems into the Software Development Process Using UML Modeling Methods, Detroit, Mich., USA, SAE 2001-01-0066.

The CARTRONIC®-based safety analysis is a method for systematic safety analysis on an abstract system level and thus supports the development principle "safety through design." The procedure for the CARTRONIC®-based safety analysis which is described in a previous publication (T. Bertram, P. Dominke, B. Müller, 1999, The Safety-Related Aspect of CARTRONIC, Detroit, Mich., USA, SAE '99, Session Code PC 26) has been fundamentally revised and expanded by including the analysis of structural error dependencies. By using this method in an early development phase, it is possible to abstractly describe errors and their causes, e.g., "error present" or "error not present." This method thus constitutes an abstraction of FMEA (failure mode and effects analysis) which has been expanded to include the analysis of structural error dependencies. FMEA is a recognized methodological procedure for analyzing, weighting and documenting systems, components and manufacturing processes and is used mainly to prevent errors. The intention of CSA is not to replace FMEA but instead merely to support system developers in an early development phase in identifying potential hazards.

First some terms are defined before the present invention is explained on the basis of an example.

Definition 1 (Global Effects)

Global effects are physical effects which affect the entire system of the motor vehicle through actuators. They are sensed by sensors (or by a driver of the vehicle) due to loss of function (e.g., failure of the brake system) or loss of comfort (e.g., due to shutdown of assistance systems such as adaptive cruise control).

Definition 2 (Functional Structure Error)

Functional structure errors (FS errors) are errors which cause a malfunction of a component or a communication.

Definition 3 (Functional Structure Error Causes)

Functional structure error causes (FS error causes) are reasons for a malfunction of a component. The reason for a malfunction of a component lies in the presence of FS errors. FS errors may be further subdivided into refined types of errors. The refined types of errors are then in turn the cause of the FS errors. The refined types of errors may be:

Component Errors:
Component dead
Component calculates incorrect values
Component is uncontrollably active
Component generates a result at the wrong time
Communication Errors:
Communication interrupted
Communication supplies incorrect information
Communication is uncontrollably active
Communication supplies information at the wrong time
Communication is misrouted FIG. 1 shows the procedure for the CARTRONIC®-based safety analysis. This method may be broken down as follows:

Step 1: Identifying global effects on the basis of the CARTRONIC® functional structure and/or the CARTRONIC® UML model Step 2: Weighting global effects by safety levels (SL)

Figure 3:
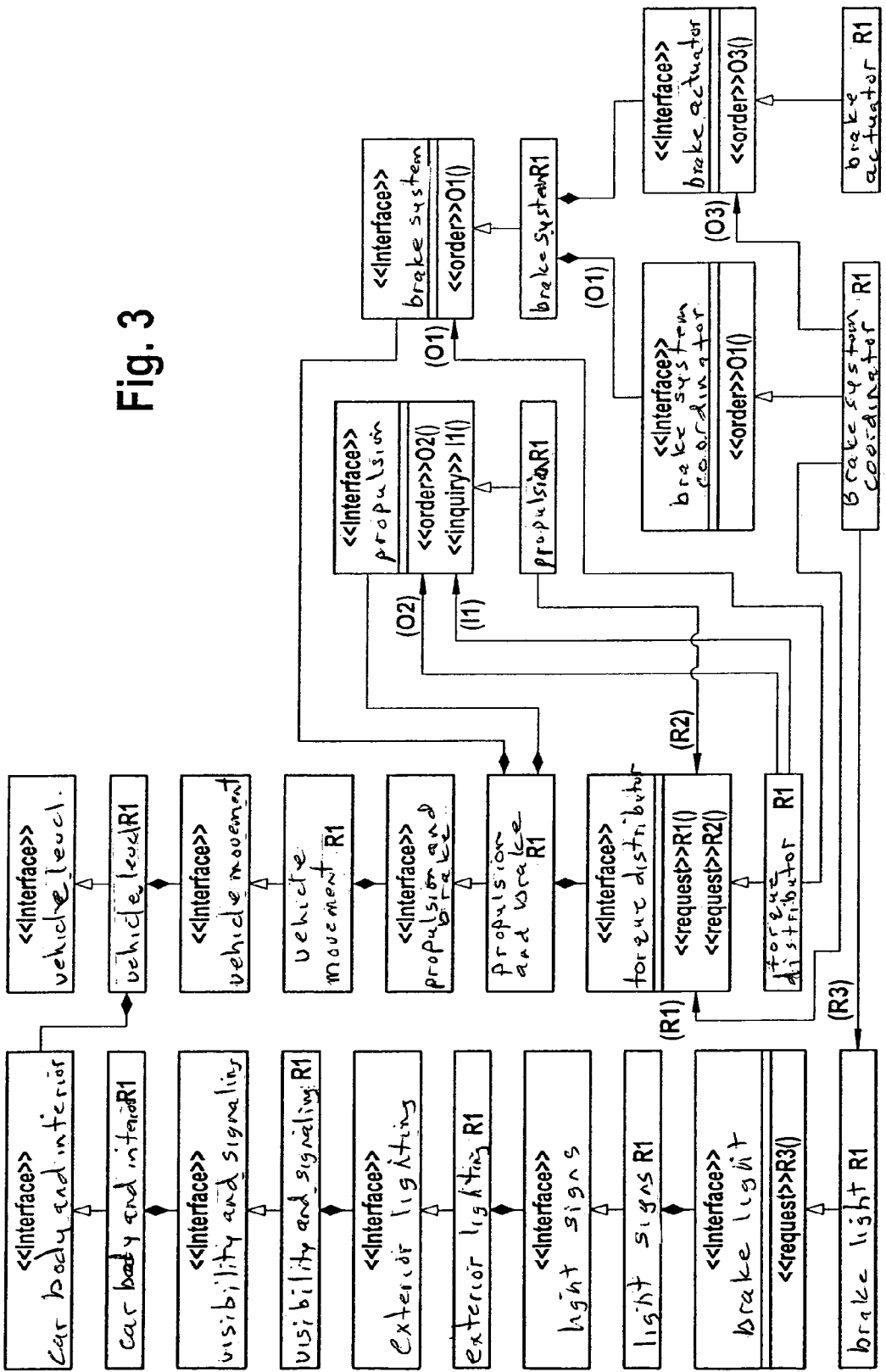
FIG. 3 shows an example of UML modeling of the CARTRONIC® functional structure according to FIG. 2.

Step 3: Analyzing FS error causes (see definition 3), i.e., analyzing errors of components or communication relationships Step 4: Assigning a malfunction of a component to the global effects Step 5: Determining measures for error detection and/or control Step 6: Creating and/or supplementing a CARTRONIC® safety structure Step 7: Verifying the resulting functional structure and safety structure under safety aspects The procedure of the CARTRONIC®-based safety analysis is described below on the basis of an example. A simplified brake system has been selected as the example. FIGS. 2 and 3 show the CARTRONIC® functional structure and the CARTRONIC® UML model of the simplified brake system. The exemplary system includes the following components: torque distributor, propulsion, brake system, brake system coordinator, brake actuator and brake light. In the logic hierarchical functional structure of CARTRONIC®, the brake system coordinator and brake actuator are components in the detailing of the brake system. The torque distributor, propulsion and brake system are components in the detail of the propulsion and the brake. In the functional structure, propulsion and brake are details of the vehicle movement. The brake light component is in the details of light and light signal which is in turn a detail of exterior lighting. This is in turn a refinement of the visibility and signaling component in the vehicle body and interior. The details vehicle movement and car body and interior are placed on the vehicle level. The vehicle level is the top level of the CARTRONIC® functional structure. The torque distributor is responsible for distributing the torque demand by the driver of the vehicle. The components brake system coordinator and propulsion request torques from the torque distributor via communications R1 and R2. If there is only a request from the propulsion then the torque distributor will ask the propulsion component for the minimum and maximum allowed torque values through communication I1 and will then ensure implementation via order O2. If there is only a request from the brake system, then it is implemented via order O1. If requests from both the propulsion and the brake system are pending, the brake system has priority. The system coordinator component in the detail of the brake system ensures the implementation of the torques via order O3 to the brake actuator and ensures triggering of the brake light using request R3 so that the driver's intent is signaled to vehicles following behind it.

Findings of the CARTRONIC®-based safety analysis are summarized in a comprehensible form and stored in the form of a table, the CSA table.

The CSA table permits an assignment of a malfunction of an individual component to error dependencies within the functional structure. The FS errors documented in the CSA table may be refined to the types of errors indicated above. The refined types of errors may be interpreted on an abstract system level as the cause for the FS error. In addition, the "internal effects" (malfunction of a component) are assigned to the global effects. In this way complex dependencies within structure-internal error dependencies and global effects are discernible.

The method described below represents a "bottom-up" approach with regard to the analysis of causes because, starting from a potential malfunction, its possible causes are identified. This procedure will now be explained on the basis of the example explained above and steps 1 through 7 described above:

Step 1: Identifying Global Effects

Global effects are derived from considering the system interface to the environment. The actuators which are triggered by the subsystem in question represent the interfaces to the environment. In the context in question here, the environment refers to the vehicle as a whole. The actuators for the exemplary system depicted in FIG. 2 and FIG. 3 are the brake system and/or (in the details) the brake actuator, the propulsion and the brake light. Only global effects for which the subsystem to be investigated is responsible are considered and, for example, input into a computer system. For example, it is not advisable to make the adaptive cruise control (ACC) subsystem, which triggers the brake system, responsible for a total loss of braking effect. These relationships are discernible via assignment tables or expert systems and are made available and accessible through the computer system in the method sequence. In an iterative procedure, different relationships may then be used in the form depicted above depending on the iteration process. This is also true of the remaining procedure as described below.

For the example depicted in FIG. 2, the following global effects may be identified, for example:

Acceleration effect→propulsion
    Uncontrolled acceleration
        Acceleration too great
        Acceleration too weak
    No acceleration
Braking effect→brake actuator
    No braking effect
    Too little braking effect
Signaling→brake light
    No display
    Continuous display (contains the scenario where the brake light comes on but there is no braking)

FIG. 4 shows the header of the table with the global effects of the CSA table.

Step 2: Weighting Global Effects Through Safety Levels

The global effects are weighted on the basis of the request classes as defined in DIN V 19250. The standard request classes are defined in general for measuring and control safety equipment. The prerequisites stipulated there are not directly transferable to motor vehicles. In this standard, the following points enter into the weighting:

dwell time in the hazard area,
one or more people are affected by the potential effects of an error.

Figure 5:
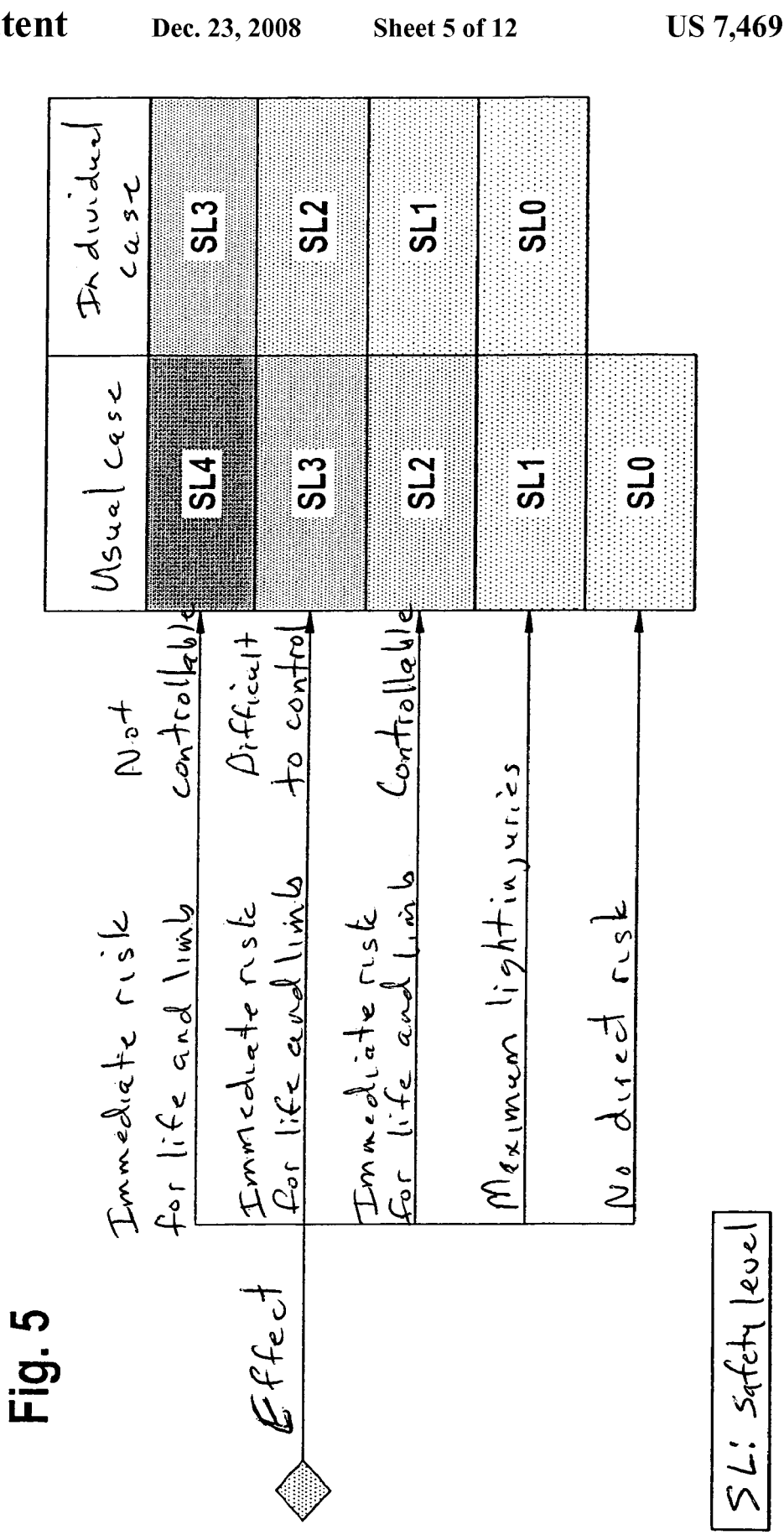
FIG. 5 shows the assignment of the error effects to the safety levels in a flow chart.
Figure 9:
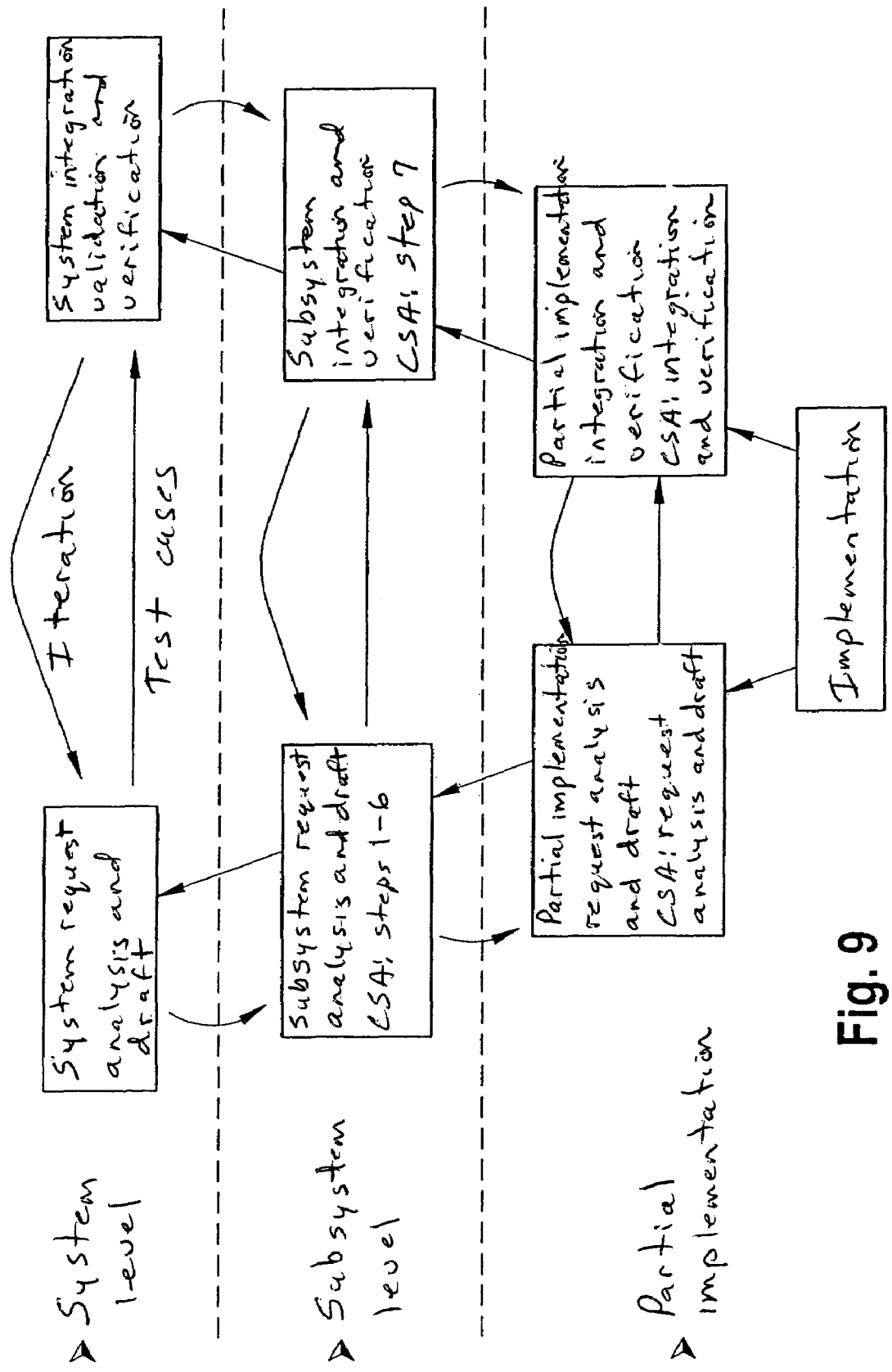
FIG. 9 shows the classification of the CSA in a development process, in particular according to the V model.

However, it is not advisable for these cases to be taken into account in the case of motor vehicles. They are to be considered from the standpoint that when operating certain machines, a person operates it from a test bench and is exposed to a potential risk only under certain prerequisites and for a limited period of time, e.g., in maintenance work. In a motor vehicle, however, one is constantly exposed to a potential risk. Furthermore, several people may always be affected by the effects of an error. In considering these objections, one arrives at the adjusted "request classes" for automobiles, referred to as safety levels (SL) in the context of the CSA. The assignment of safety levels to error effects is depicted in the riskograph in FIG. 5.

A distinction is made as to whether an effect occurs in an individual case or systematically. In an individual case means that the corresponding effect need not be expected in the majority of cases. Event frequencies may be assigned to the safety levels. Such an event frequency is to be understood as a setpoint variable which is to be fulfilled by the subsequent implementation of one component. As a rule, a priori verification of the event frequencies is impossible because reliable data is frequently available only after use in mass-produced vehicles. However, it is possible to subsequently compare the setpoint value of the event frequency which is associated with a safety level with an actual value that has been determined. If a deviation occurs here, i.e., if the event frequency actually determined is greater than the admissible event frequency of a safety level, then measures must be taken to reduce the event frequency.

FIG. 6 illustrates the weighting of the global effects of the brake system via safety levels. A brake system is an important functionality of a motor vehicle which must be ensured under all circumstances. The global effect "no braking effect" usually represents a threat to life and limb which is not controllable by the driver of the vehicle. Therefore, safety level SL4 must be specified here. For the effect "no acceleration" safety level SL1 is issued because it may usually be assumed here that maximally mild injuries are to be expected here, e.g., due to rear end collisions at a low speed difference. In individual cases there may be risk to life and limb but it is controllable, e.g., by turning on a warning flashing light system.

To give an uncluttered depiction below, the refinement of the table column "uncontrolled acceleration" will be omitted here.

Step 3: Functional Structure Error Cause Analysis

In the cause analysis, the question raised is: What causes a malfunction of a component {torque distributor, propulsion, brake system, brake system coordinator, brake actuator, brake light}?

The cause analysis investigates possible causes of a malfunction of the CARTRONIC® components {torque distributor, propulsion, brake system, brake system coordinator, brake actuator, brake light}. A malfunction of components and their details, if known, are investigated. For the cause analysis, the CARTRONIC® functional structure of the system in question is used in the header row "functional structure" of the CSA table. In addition, the CARTRONIC® functional structure is included in the column "malfunction of components" (see FIG. 7).

If an FS error in a component causes a malfunction in the same component, the component from the functional structure is assigned to a malfunction of the same component (labeled with "x," see FIG. 7). In addition, relevant FS errors of the communication relationships are also taken into account for the component. If an FS error of a communication relationship causes a malfunction, then there is also an assignment to the functional structure which indicates the type and name of the communication in question. The type of communication relationship is designated with the upper-case first letter of the English term of the communication. Consequently an "O" is used for an order, a "R" is used for a request and a "I" is used for an inquiry. The type of communication is followed by an underscore "_" followed by the name of the communication relationship (e.g., I_I1).

In the analysis of causes for a malfunction of a component, the following are taken into account:

component itself and
incoming orders
incoming requests
outgoing inquiries.

The error dependencies are subsequently investigated. This makes it possible to determine which additional components and communications may be responsible for a malfunction of the component in question. The communication(s) listed in column M are tracked back and the newly found component(s) in the same line is/are assigned to the component malfunction. One of the newly found components is used as the new starting point. The communication(s) assigned to this component is/are determined and included in column M of the corresponding component. Again the communications assigned to this component are tracked back. New starting components are thus found. This process is repeated iteratively until there are no additional communications and/or all reachable components have been run through (see following example and FIG. 8).

EXAMPLE

A malfunction of the torque distributor component ($fc_1$) is due to the fact that a component error has occurred in the torque distributor component ($fc_1$) itself, a communication error has occurred in inquiry I1 or request R1 or request R2, a component error has occurred in the propulsion component ($fc_3$), or a communication error has occurred in order O2, and/or a component error has occurred in the brake system coordinator component ($fc_{21}$) or in order O1.

A malfunction of the brake system component ($fc_2$) is caused by the fact that either a component error has occurred in the brake system ($fc_2$) itself, or a communication error has occurred in order O1, or a component error has occurred in torque distributor ($fc_1$) with the potential communication errors to be taken into account here including request R1, request R2 and inquiry I1, or an error has occurred in the propulsion component ($fc_3$), or a communication error has occurred in order O2.

The entries in the CSA table for the example depicted in FIG. 2 are shown in FIG. 8, in particular FIG. 8a.

If a malfunction of a component is considered in the refinement, then the shell for the causal analysis is not of interest because only communication relationships are sent from the higher level into the refinement. The column brake system (brake system ($fc_2$) is the shell for the brake system coordinator and the brake actuator) of the "functional structure" need not be taken into account for the causal analysis of a malfunction of the brake system coordinator component (line for the brake system coordinator ($fc_{21}$) in the column "malfunction of components"). In the causal analysis of a malfunction of the brake light component, it is not necessary to perform the analysis for the brake system component if the analysis for the refinement of the brake system component has been performed. Possible causes are already taken into account in considering the refinement (brake system coordinator and brake actuator).

The CSA table thus makes it possible to track logic error dependencies. The columns of the functional structure having multiple entries, e.g., the column for the torque distributor ($fc_1$) and the column for the propulsion ($fc_3$), are important components because an error there affects large portions of the system.

Step 4: Assignment of a Malfunction of a Component to the Global Effects

First the global effects identified in step 1 are assigned to the components whose malfunction has caused a global effect. These components are the system interfaces (see step 1).

This assignment has already been depicted in step 1.
Acceleration effect→Propulsion malfunction
Braking effect→Brake actuator malfunction
Signaling→Brake light malfunction This assignment in the CSA table is shown in FIG. 8b. The error dependencies determined in step 3 yield an assignment of the other components to the global effects. This is achieved by considering the columns of the functional structure for the rows of the system interfaces (malfunction of the brake actuator ($fc_{22}$), propulsion ($fc_3$) and brake light ($fc_4$) components). Each column of the functional structure assigned to a malfunction of the system interfaces, i.e., marked with an "x," may cause the same global effects. All global effects assigned to the components of the detail are assigned to the shell of a detail. The result of this step is to depicted in FIG. 8c.

EXAMPLE

The torque distributor ($fc_1$) component in the functional structure is considered below. The torque distributor ($fc_1$) component in the functional structure is assigned to the line for malfunction of the brake actuator ($fc_{22}$), i.e., an FS error in the torque distributor component may cause a malfunction in the brake actuator. This allows the conclusion to be drawn that a malfunction of the torque distributor component may also have global effects on the brake actuator. The global effects of a malfunction of the brake actuator ("no braking effect" and "too little braking effect") are thus also assigned to the malfunction of the torque distributor. Furthermore, an FS error in the torque distributor ($fc_1$) component may cause a malfunction of the propulsion ($fc_3$). A malfunction of the torque distributor component may also cause "uncontrolled acceleration" and "no acceleration" as global effects. An FS error in the torque distributor ($fc_1$) component may cause a malfunction of the brake light ($fc_4$). Thus a malfunction of the torque distributor component may cause "no display" and "continuous display" as global effects.

A malfunction of the brake system ($fc_2$) as the shell of the brake system coordinator ($fc_{21}$) and brake actuator ($fc_{22}$) components may cause global effects for all its components in the detail.

Step 4.1: Assigning Safety Levels to a Malfunction of Components

The maximum value of the safety level of the global effects assigned to a malfunction in a row is entered in the corresponding element in column SL. This procedure is illustrated in FIG. 8d.

Step 5: Measures for Error Detection and/or Correction

The two tables which follow contain measures for error detection and correction for components (Table 2) and communication relationships (Table 3).

TABLE 2

Summary of measures for error detection and correction for functional components.

| Type of error | Measures | |
|---|---|---|
| (cause) | Error detection | Error correction |
| Component dead | Confirmation with respect to communication content<br>Functional redundancy<br>Control computation with alternative input variables<br>Control computation/inquiry with reference values or input samples<br>Monitoring physical and/or electric quantities under known boundary conditions<br>Time and logic sequence monitoring | Redundancy<br>Shutdown of the subfunction influenced by the error<br>Turning off the electronics on basic vehicle function<br>Secure shutdown state<br>System remains faulty during operation<br>Error correction<br>Situation-dependent change in strategy to reach objective with reduced means<br>Additional means |

TABLE 2-continued

Summary of measures for error detection and correction for functional components.

| Type of error (cause) | Measures | |
|---|---|---|
| | Error detection | Error correction |
| Calculates wrong values | Confirmation with respect to communication content Functional redundancy Control computation with alternative input variables Control computation/inquiry with reference values or input samples Monitoring physical and/or electric quantities under known boundary conditions | Redundancy Shutdown of the subfunction influenced by the error Turning off the electronics on basic vehicle function Secure shutdown state System remains faulty during operation Error correction Situation-dependent change in strategy to reach objective with reduced means Additional means |
| Un-controllably active | Confirmation with respect to communication content Functional redundancy Control computation with alternative input variables Control computation/inquiry with reference values or input samples Monitoring physical and/or electric quantities under known boundary conditions | Redundancy Shutdown of the subfunction influenced by the error Turning off the electronics on basic vehicle function Secure shutdown state System remains faulty during operation Error correction Situation-dependent change in strategy to reach objective with reduced means Additional means |

TABLE 3

Summary of measures for error detection and correction for communication relationships.

| Type of error (cause) | Measures | |
|---|---|---|
| | Error detection | Error correction |
| Un-controllably active | Confirmation with respect to communication content Functional redundancy Control computation with alternative input variables Control computation/inquiry with reference values or input samples Monitoring transmission paths Monitoring physical and/or electric quantities under known boundary conditions Time and logic sequence monitoring Dynamic formulation of communications and computed values | Redundancy Shutdown of the subfunction influenced by the error Turning off the electronics on basic vehicle function Secure shutdown state System remains faulty during operation Error correction Situation-dependent change in strategy to reach objective with reduced means Additional means Time and logic control monitoring |
| Mis-routing | Confirmation with respect to communication content Functional redundancy Control computation with alternative input variables Control computation/inquiry with reference values or input samples Monitoring transmission paths Monitoring physical and/or electric quantities under known boundary conditions Time and logic sequence monitoring | Redundancy Shutdown of the subfunction influenced by the error Turning off the electronics on basic vehicle function Secure shutdown state System remains faulty during operation Error correction Situation-dependent change in strategy to reach objective with reduced means Additional means |

TABLE 3-continued

Summary of measures for error detection and correction for communication relationships.

| Type of error (cause) | Measures | |
|---|---|---|
| | Error detection | Error correction |
| | Dynamic formulation of communications and computed values | |
| Interruption | Confirmation with respect to communication content Functional redundancy Control computation with alternative input variables Control computation/inquiry with reference values or input samples Monitoring physical and/or electric quantities under known boundary conditions Time and logic sequence monitoring | Redundancy Shutdown of the subfunction influenced by the error Turning off the electronics on basic vehicle function Secure shutdown state System remains faulty during operation Error correction Situation-dependent change in strategy to reach objective with reduced means Additional means |
| Information at wrong time | Confirmation with respect to communication content Functional redundancy Control computation with alternative input variables Control computation/inquiry with reference values or input samples Monitoring physical and/or electric quantities under known boundary conditions Time and logic sequence monitoring | Redundancy Shutdown of the subfunction influenced by the error Turning off the electronics on basic vehicle function Secure shutdown state System remains faulty during operation Situation-dependent change in strategy to reach objective with reduced means Additional means |
| Result at wrong time | Confirmation with respect to communication content Functional redundancy Control computation with alternative input variables Control computation/inquiry with reference values or input samples Monitoring physical and/or electric quantities under known boundary conditions Time and logic sequence monitoring | Redundancy Shutdown of the subfunction influenced by the error Turning off the electronics on basic vehicle function Secure shutdown state System remains faulty during operation Situation-dependent change in strategy to reach objective with reduced means Additional means |
| Delivers wrong information | Confirmation with respect to communication content Functional redundancy Control computation with alternative input variables Control computation/inquiry with reference values or input samples Monitoring transmission paths Monitoring physical and/or electric quantities under known boundary conditions | Redundancy Shutdown of the subfunction influenced by the error Turning off the electronics on basic vehicle function Secure shutdown state System remains faulty during operation Error correction Situation-dependent change in strategy to reach objective with reduced means Additional means |

Providing measures for error detection and/or error correction on a high abstraction level is difficult before there is any concrete system implementation. For many abstract errors in the CSA table, effective and economically reasonable measures for error detection and correction may be provided only if they are given as a function of implementation, i.e., for a concrete system topology. Otherwise for a study that is independent of the implementation, there are too many possibilities that may be given on an abstract level for achieving the object (see Table 2 and Table 3). These measures provide possibilities for detection and correction of the abstract causes. These abstract causes may be understood as error modes (types of errors) of the more general FS errors (see definition 3).

At a high abstraction level, it is possible to suggest measures which are obvious in an early phase of development. This includes measures which prevent error propagation or are based on plausibility. Thus it may be obvious that a signal may be only within certain limiting values. Error propagation may be delimited by redundancy. Redundant structures may be converted into inexpensive measures in later development phases, i.e., when the topology implemented is known in detail. An example of this is codes for error detection and correction. The plain text descriptions in the tables may be shortened and assigned in the program, i.e., computer system, by using codes.

An optimum approach of a technical and economic type may be found only when an error is considered within a known topology. If the cause "supplies wrong information" is identified as critical for an inquiry, then the measure to be taken depends very greatly on how the inquiry is implemented. If the inquiry as to the value is within a processor system (e.g., internal memory) then perhaps no measure need be taken (intrinsically safe), i.e., the processor system may be considered as an overall unit and thus a plurality of operations may be monitored using a single measure such as the watchdog timer. If the communication proceeds via an external connection (cable, bus system), then the connection/message transmission may have to be designed using redundancy. In the case of EMF problems, it may be sufficient if a connection over a shielded cable without any additional electronic complexity is ensured.

Step 6: CARTRONIC® Safety System

The CARTRONIC® representation of a system (depicted for an example in FIG. 2) may be mapped into a CARTRONIC® UML model (FIG. 3). This allows a more formal system specification than CARTRONIC®. In addition, UML is an internationally standardized language. However, for the description of a system topology, it is necessary to expand the existing CARTRONIC® UML model. The expansion must include the mapping of the measures for error detection and control, partitioning of the functions onto control units and representation of chronological and logic sequences. The expanded structure may be used for documentation of the safety measures used. A representation containing structure, functionality and topology is suitable for future quantitative system analyses, in particular for automated implementation.

Step 7: Verification

During the verification, a check is performed to determine whether the results of the CARTRONIC®-based safety analysis result in a product specification being met. This investigates whether the safety levels provided conform to the requirements of the specification, i.e., whether the safety levels to be achieved match those to be provided and thus to be achieved. If this is not the case then another iteration of the CARTRONIC®-based safety analysis may be run through. This iterative improvement process is continued until all the requirements of the specification and/or the given safety levels are met.

FIG. 12 shows the insertion of the CSA into a development process. The development process used is based on the V model. The V model is a development standard of the Association for IT Systems. It is possible to adapt the V model to given project-specific boundary conditions. This procedure is known as tailoring. In the V model, activities and their products are defined. The incremental iterative V model (IIV model) adapted for the CARTRONIC®-based development process is used on the three levels, i.e., the system level, the subsystem level and the partial implementation level. Navigation in the IIV model is along the arrows indicated. It is possible to move from the left to the right side of one level of the V model (test cases) and back (iterations). Multiple increments are also possible between the levels. On the partial implementation level, for example, it is possible to recognize that additional functions are needed for an implementation. An additional increment may then be run through by introducing the functions and their interactions on the system level and implementing them in turn on the partial implementation level. On the system level the motor vehicle as a whole is considered. The subsystem level details the overall system of the motor vehicle in subsystems. These subsystems may include for example the engine controller, the brake system, the transmission or an adaptive cruise control. The subsystem level represents the subsystems of the motor vehicle that are still independent of the implementation, i.e., only the functionality is considered but not the technical implementation. On the partial implementation level, each subsystem is detailed further. A decision is made regarding a topology and whether a function is implemented as software, computer hardware, hydraulics, electronics, electrics, mechanics, etc. A corresponding subsystem is then created and the software is implemented if that is the case. On each level of the IIV model, a request analysis is performed on the left side of the V model and a draft is prepared. The right side of the IIV model is used for integration and verification of the draft prepared on the corresponding level. In addition to the processes described, validation may also be performed on the system level. A validation checks on whether the system specification meets the requirements. However, the verification checks a product with respect to the specification.

The procedure steps, i.e., steps 1 through 5, are performed in the analysis phase of the subsystem level. Step 6 is implemented in the draft phase of the subsystem level. On the basis of the discussions in step 5, namely that a concretization of measures for error detection and correction is often advisable only in the case of a known system topology, it is advisable to perform detailing of the safety measures in step 5 and step 6 on the partial implementation level. In this phase, the system topology, i.e., partitioning of the functionalities among control units is performed and the function implementations are stipulated. CSA as described here is thus used mainly on the subsystem level. However it is advantageous to also continue CSA on the partial implementation level where a request analysis is performed to determine how safety measures are to be designed as a function of the topology and the implementation of the subsystem and a corresponding draft is prepared. This draft and its integration may be verified on the right side of the IIV model.

The present invention described and shown herein may be automated to run on a computer system. To do so, individual steps or parts of these steps as well as the tables may be represented as a computer program including data and commands so that the steps 1 through 7 may be stored as program code and are executed in a device, in particular a computer system for executing a method according to the present invention. Any possible form may be used as the memory or data medium, e.g., CD-ROM, DVD, diskette, EPROM, flash EPROM, ROM, RAM, etc., which is thus a computer program product in conjunction with the computer program. In particular a transmission of the program via networks such as the Internet from one memory to another memory and/or network subscribers would also fall under the scope of the present invention.

What is claimed is:

1. A method for performing a safety analysis in a system of a motor vehicle, the system including a plurality of components linked by communication relationships, the components and the communication relationships forming a functional structure of the system, the method comprising:
determining errors as a function of the functional structure;
analyzing error dependencies with respect to the functional structure;
tracking the error dependencies in the functional structure;
determining global effects of the errors;
determining errors which cause a malfunction of a component or a communication relationship;
determining measures for at least one of error detection and error control;
determining an achievable safety level and comparing the determined safety level with the selected safety level; and
restarting the method at the tracking as a function of the comparison until achieving the safety level.

2. The method as recited in claim 1, wherein the determining errors step includes tracking the error dependencies in the functional structure to generate error paths, global effects of the errors being determined as ends of the error paths.

3. The method as recited in claim 1, wherein the determining errors step includes tracking the error dependencies in the functional structure to generate error paths, global effects of the errors being determined and weighted as ends of the error paths.

4. The method as recited in claim 3, wherein the global effects are weighted by determining at least one safety level.

5. The method as recited in claim 1, further comprising:
determining errors which cause a malfunction of a component or a communication relationship.

6. The method as recited in claim 2, further comprising:
assigning malfunctions of a component or a communication relationship to the global effects.

7. The method as recited in claim 1, further comprising:
determining measures for at least one of error detection and error control.

8. The method as recited in claim 2, further comprising:
expanding the functional structure so that at least one of the global effects and a malfunction of a component or a communication relationship, are taken into account.

9. The method as recited in claim 1, further comprising:
expanding the functional structure in such a way that measures are included for at least one of error detection and error control.

10. A method for achieving a preselectable safety level in a system in a motor vehicle, the system including a plurality of components linked by communication relationships, the components and the communication relationships forming a functional structure of the system, the method comprising:
determining errors as a function of the functional structure;
analyzing error dependencies with respect to the functional structure;
tracking the error dependencies in the functional structure;
generating error paths;
determining global effects of the errors;
weighting the global effects as a function of a selected safety level;
determining errors which cause a malfunction of a component or a communication relationship;
assigning the malfunction of a component or a communication relationship to the global effects;
determining measures for at least one of error detection and error control;
determining an achievable safety level and comparing the determined safety level with the selected safety level; and
restarting the method at the tracking step as a function of the comparison until achieving the safety level.

11. The method as recited in claim 10, further comprising:
documenting of the functional structure.

12. The method as recited in claim 1, further comprising:
representing the functional structure using UML.

13. A computer system, the computer system programmed for performing a safety analysis of a system of a motor vehicle, the system of the motor vehicle including a plurality of components linked by communication relationships, the components and the communication relationships forming a function structure of the steps, the computer system configured to perform the steps of:
determining errors as a function of the functional structure; and
analyzing error dependencies with respect to the functional structure;
tracking the error dependencies in the functional structure;
determining global effects of the errors;
determining errors which cause a malfunction of a component or a communication relationship;
determining measures for at least one of error detection and error control;
determining an achievable safety level and comparing the determined safety level with the selected safety level; and
restarting the method at the tracking as a function of the comparison until achieving the safety level.

14. A computer program for performing a safety analysis of a system of a motor vehicle, the system of the motor vehicle including a plurality of components linked by communication relationships, the components and the communication relationships forming a function structure of the steps, the computer program, when executed by a computer system, causing the computer system to perform the steps of:
determining errors as a function of the functional structure; and
analyzing error dependencies with respect to the functional structure;
tracking the error dependencies in the functional structure;
determining global effects of the errors;
determining errors which cause a malfunction of a component or a communication relationship;
determining measures for at least one of error detection and error control;
determining an achievable safety level and comparing the determined safety level with the selected safety level; and
restarting the method at the tracking as a function of the comparison until achieving the safety level.

15. A storage device storing computer program for performing a safety analysis of a system of a motor vehicle, the system of the motor vehicle including a plurality of components linked by communication relationships, the components and the communication relationships forming a function structure of the steps, the computer program, when executed by a computer, causing the computer to perform the steps of:
determining errors as a function of the functional structure; and
analyzing error dependencies with respect to the functional structure;

tracking the error dependencies in the functional structure;

determining global effects of the errors;

determining errors which cause a malfunction of a component or a communication relationship;

determining measures for at least one of error detection and error control;

determining an achievable safety level and comparing the determined safety level with the selected safety level; and restarting the method at the tracking as a function of the comparison until achieving the safety level.

* * * * *